United States Patent
Lee et al.

(10) Patent No.: US 8,199,847 B2
(45) Date of Patent: Jun. 12, 2012

(54) METHOD AND APPARATUS FOR PROVIDING HIGHER ORDER MODULATION THAT IS BACKWARDS COMPATIBLE WITH QUATERNARY PHASE SHIFT KEYING(QPSK) OR OFFSET QUATERNARY PHASE SHIFT KEYING (OQPSK)

(75) Inventors: Lin-Nan Lee, Potomac, MD (US);
Feng-Wen Sun, Germantown, MD (US);
Mustafa Eroz, Germantown, MD (US);
Yimin Jiang, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1142 days.

(21) Appl. No.: 11/879,607

(22) Filed: Jul. 18, 2007

(65) Prior Publication Data

US 2007/0263751 A1 Nov. 15, 2007

Related U.S. Application Data

(63) Continuation of application No. 10/142,703, filed on May 10, 2002, now Pat. No. 7,260,159.

(60) Provisional application No. 60/314,520, filed on Aug. 22, 2001.

(51) Int. Cl.
*H03C 5/00* (2006.01)
*H03D 5/00* (2006.01)
*H03K 7/10* (2006.01)
*H03K 9/10* (2006.01)

(52) U.S. Cl. ........ 375/269; 375/280; 375/281; 375/261; 375/298; 375/300; 375/308; 375/329; 375/332; 375/279

(58) Field of Classification Search .................. 375/269, 375/280, 281, 261, 298, 300, 308, 329, 332, 375/279
See application file for complete search history.

(56) References Cited

U.S. PATENT DOCUMENTS

| | | |
|---|---|---|
| 5,175,746 A | 12/1992 | Inoue et al. |
| 5,541,955 A | 7/1996 | Jacobsmeyer |
| 5,606,578 A | 2/1997 | O'Dea |
| 5,943,380 A | 8/1999 | Marchesani et al. |
| 5,963,594 A | 10/1999 | Farrow |
| 5,966,412 A | 10/1999 | Ramaswamy |
| 5,987,068 A | 11/1999 | Cassia et al. |

*Primary Examiner* — Shuwang Liu
*Assistant Examiner* — Nader Bolourchi

(57) ABSTRACT

A method and apparatus for providing an asymmetrical backwards compatible communications signal that is capable of being decoded by QPSK and OQPSK receivers as well as PSK and QAM receivers is provided. The invention comprises a timing error accumulator coupled to a first bit stream. The first bit stream includes content that is common to the QPSK/OQPSK receiver and to the PSK/QAM receiver. A phase error accumulator is coupled to a second bit stream and adjusts the phase of symbols in the second bit stream. A phase and timing error compensator is coupled to the phase error accumulator and the timing error accumulator and adjusts the first and second bit streams received from the phase error accumulator and the timing error accumulator in order to reduce timing and phase errors. A higher order modulator coupled to the phase- and timing error compensator is also provided. The higher order modulator processes the first and second bit streams to provide the asymmetrical backwards compatible signal.

32 Claims, 18 Drawing Sheets

```
    X         X              X            X  X  X  X
                          X      X
                                          X  X  X  X
                        X          X
                                          X  X  X  X
                          X      X
    X         X              X            X  X  X  X
 QPSK OR O-QPSK             8-PSK            16-QAM
```

|  |  |  |  |  |  |
|---|---|---|---|---|---|
| B0<br>B1 | A1<br>  A0 | B1<br>B0 |   A1<br>A0 | B11 B01<br>B10 B00 | A10 A11<br>A00 A01 |

|  |  |  |  |  |  |
|---|---|---|---|---|---|
| C0<br> C1 |   D1<br>D0 | C0<br> C1 | D0<br>  D1 | C01 C00<br>C11 C10 | D00 D10<br>D01 D11 |

FIG. 6A     FIG. 6B     FIG. 6C

|  |  |  |  |  |  |
|---|---|---|---|---|---|
|   B1<br>B0 | A1<br>  A0 | B1<br>B0 |   A1<br>A0 | B11 B10<br>B01 B00 | A10 A11<br>A00 A01 |

|  |  |  |  |  |  |
|---|---|---|---|---|---|
| C0<br> C1 | D0<br>  D1 | C0<br> C1 | D0<br>  D1 | C01 C00<br>C11 C10 | D00 D01<br>D10 D11 |

METHOD AND APPARATUS FOR PROVIDING HIGHER ORDER MODULATION THAT IS BACKWARDS COMPATIBLE WITH QUATERNARY PHASE SHIFT KEYING(QPSK) OR OFFSET QUATERNARY PHASE SHIFT KEYING (OQPSK)

CROSS REFERENCE TO RELATED CASES

This application is a continuation of U.S. patent application Ser. No. 10/142,703 filed May 10, 2002, now U.S. Pat. No. 7,260,159 entitled "METHOD AND APPARATUS FOR PROVIDING HIGHER ORDER MODULATION THAT IS BACKWARDS COMPATIBLE WITH QUATERNARY PHASE SHIFT KEYING (QPSK) OR OFFSET QUATERNARY PHASE SHIFT KEYING (OQPSK)" by Lin-Nan Lee, Feng-Wen Sun, Mustafa Eroz and Yimin Jiang, which application is hereby incorporated by reference herein and further claims the benefit of priority under 35 U.S.C. 119 §(e) to U.S. Provisional Patent Application No. 60/314,520, filed on Aug. 22, 2001.

BACKGROUND OF THE INVENTION

1. Field of the Invention

The present invention relates to a method and apparatus for providing higher order modulation in a satellite communications system that is backwards compatible with QPSK and OQPSK signal formats. More particularly, the present invention relates to a method and apparatus for reducing the power requirements for a higher order modulation signal in the satellite communications system while still maintaining the carrier phase and symbol timing synchronization for QPSK and OQPSK receivers.

2. Description of the Related Art

Satellite television users were once limited to viewing less than 50 channels, had non-High Definition Television (HDTV) viewing capability, were used for non-local station viewing, and could not receive data simultaneously with video. However, modem technology and changes in the broadcasting laws now allow satellite viewers to access over 500 channels, view HDIV and local stations, and receive data and video simultaneously. Viewers, for example, can now select channels from different categories to view music channels, history channels, news channels, etc. The large choice of channels is much greater than what is presently offered by cable and broadcast television. This has led to an increase in satellite subscribers and also to a high retention rate for current satellite subscribers.

Increasing the channel capacity to over 500 channels, providing viewers with HDTV and local station viewing capability as well as data and video capability required manufacturing new receiver boxes to receive and decode the new signals being broadcast from the satellites. The new information signals provide much more information than the conventional QPSK and OQPSK signals. DirecTV™, for example, has over 10 million subscribers. Some of these subscribers use satellite receiver boxes capable of only processing the QPSK signals. As technologies improve and operation conditions changes, it is desirable to introduce new services with more capable receiver boxes. QPSK and OPSK modulation uses two bits per symbol and are commonly depicted in a four point constellation as shown in FIG. 1A.

The new satellites for local-to-local services have spot beam transponders with substantially higher effective isotropically radiated power ("e.i.r.p."). More information can be transmitted through these transponders with higher order modulation using new signaling formats such as 8-Phase Shift Keying (PSK) or 16-Quadrature Amplitude Modulation (QAM). 8-PSK and 16-QAM deliver 3 or 4 bits per symbol, respectively, which is greater than the 2 bits per symbol for the QPSK and OQPSK receivers. Exemplary 8-PSK and 16-QAM constellations are shown in FIGS. 1B and 1C respectively.

As discussed, the QPSK and OQPSK receivers can not demodulate conventional 8-PSK and/or 16 QAM signals. However, it is cost prohibitive for a satellite provider to retrieve the QPSK and OQPSK satellite receivers and exchange them for the new PSK and QAM receivers when not all subscribers need to receive the additional information provided by the higher modulation of the 8-PSK or 16-QAM signal format. It is also cost prohibitive to broadcast two separate signal formats using separate satellites to service the two types of receivers.

Thus, a need exists for allowing a smooth transition to a more efficient bandwidth signal format for providing additional services that are compatible with both the old and new receivers.

SUMMARY OF THE INVENTION

An object of the present invention is to provide a system and method for providing a satellite signal in a satellite communications system that is compatible with receivers that receive high compression signals and receivers that receive low compression signals.

Another object of the present invention is to provide a system and method that reduces the number of satellites required to broadcast two types of signals in a satellite communications system.

These and other objects of the present invention are substantially achieved by providing an apparatus for providing an asymmetrical backwards compatible communications signal that is capable of being decoded by QPSK and OQPSK receivers as well as PSK and QAM receivers. The invention comprises a timing error accumulator coupled to a first bit stream. The first bit stream includes content that is common to the QPSK/OQPSK receiver and to the PSK/QAM receiver. A phase error accumulator is coupled to a second bit stream and adjusts the phase of symbols in the second bit stream. A phase and timing error compensator is coupled to the phase error accumulator and the timing error accumulator and adjusts the first and second bit streams received from the phase error accumulator and the timing error accumulator in order to reduce timing and phase errors. A higher order modulator coupled to the phase and timing error compensator is also provided. The higher order modulator processes the first and second bit streams to provide the asymmetrical backwards compatible signal.

The common content can include broadcast channels that are common to both receivers whereas the additional content can include information not processed by a QPSK/OQPSK receiver such as data, HDTV and local channel content.

Another object of the present invention is to provide a method for providing a backward compatible modulated signal. The method comprises modulating a first and a second input signal at a transmitter to obtain the backward compatible modulated signal. The backward compatible modulated signal includes a first output signal and a second output signal. The backward compatible modulated signal is provided to a first receiver and a second receiver. The first receiver demodulates the first output signal, while the second receiver demodulates the second output signal based on content contained in the first output signal.

The transmitter further expands a signal constellation associated with the backward compatible signal to achieve a higher throughput for the backward compatible signal. Expansion comprises arranging each symbol associated with the backward compatible signal into a cluster.

BRIEF DESCRIPTION OF THE DRAWINGS

The details of the present invention can be readily understood by considering the following detailed description in conjunction with an accompanying drawing, and with:

FIG. 1A is an example of a conventional Quaternary Phase Shift Keying (QPSK) and Offset Quaternary Phase Shift Keying (OQPSK) constellation;

FIG. 1B is an example of a conventional 8-Phase Shift Keying (PSK) constellation;

FIG. 1C is an example of a conventional 16-Quadrature Amplitude Modulation (QAM) constellation;

FIG. 2A is an example of an asymmetric backward compatible 8-Phase Shift Keying constellation in accordance with an embodiment of the present invention;

FIG. 2B is an example of an asymmetric backward compatible 8 Quadrature Amplitude Modulation constellation in accordance with an embodiment of the present invention;

FIG. 2C is an example of an asymmetric backward compatible 16 Quadrature Amplitude Modulation constellation in accordance with an embodiment of the present invention;

FIG. 6A is an example of an 8 Phase Shift Keying constellation showing transitions between clusters in accordance with an embodiment of the present invention;

FIG. 6B is an example of an 8 Quadrature Amplitude Modulation constellation showing transitions between clusters in accordance with an embodiment of the present invention;

FIG. 6C is an example of a 16 Quadrature Amplitude Modulation constellation showing transitions between clusters in accordance with an embodiment of the present invention;

FIG. 7A is an example of an 8 Phase Shift Keying constellation using alternative coding in accordance with an embodiment of the present invention;

FIG. 7B is an example of an 8 Quadrature Amplitude Modulation constellation using alternative coding in accordance with an embodiment of the present invention;

FIG. 7C is an example of a 16 Quadrature Amplitude Modulation constellation using alternative coding in accordance with an embodiment of the present invention;

To facilitate understanding, identical reference numerals have used, where possible, to designate identical elements that are common to the figures.

DETAILED DESCRIPTION OF THE INVENTION

Figures 3, 4A, 4B, 4C:
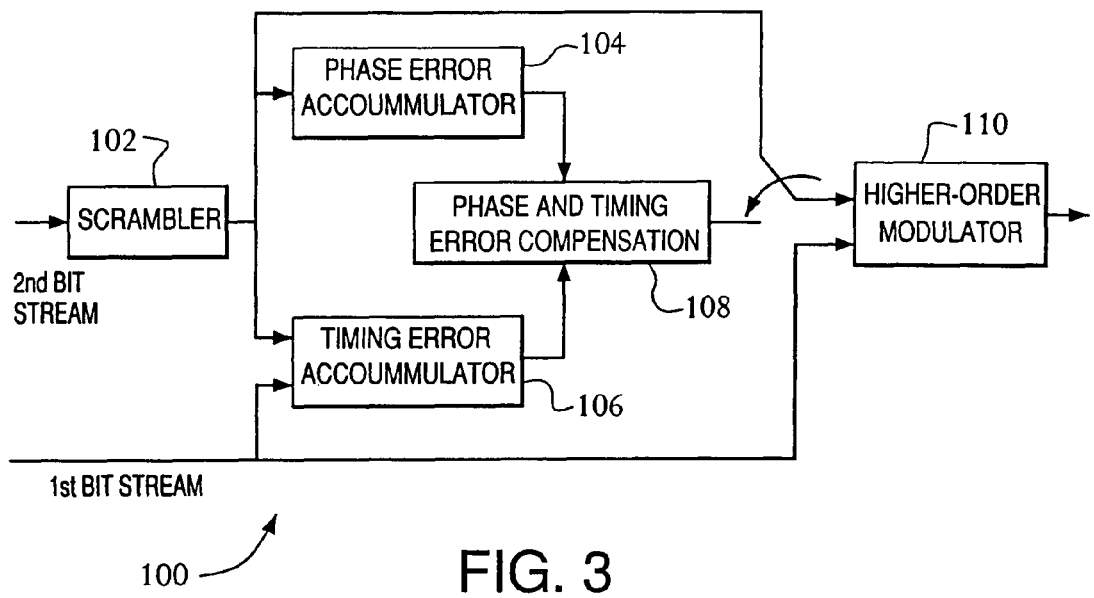
FIG. 3 is a block diagram of a satellite communications transmission system in accordance with an embodiment of the invention.
FIG. 4A is an example of a coded 8 Phase Shift Keying constellation in accordance with an embodiment of the present invention.
FIG. 4B is an example of a coded 8 Quadrature Amplitude Modulation constellation in accordance with an embodiment of the present invention.
FIG. 4C is an example of a coded 16 Quadrature Amplitude Modulation constellation in accordance with an embodiment of the present invention.

FIG. 3 is a block diagram of a satellite communications transmission system 100 in accordance with an embodiment of the present invention. The system 100 comprises a scrambler 102, a phase error accumulator 104, a phase and timing error compensator 108, a timing error accumulator 106, and a higher order modulator 110, as well as a first and second bit stream.

The system 100 operates to reduce the power requirement of a PSK and QAM signal while still maintaining carrier phase and symbol timing synchronization for QPSK and OQPSK receivers. The information signal is modified in accordance with an embodiment of the invention such that a PSK and QAM receiver as well as a QPSK and OQPSK receiver can process the same signal to retrieve the required content from the incoming signal. A QPSK/OQPSK receiver is referred to as an old technology receiver while a QAM PSK receiver is referred to as a new technology receiver.

An embodiment of the present invention operates in the following manner. Satellite information is separated into two bit streams. The first bit stream includes content that is common to both a QPSK/OQPSK receiver and a PSK/QAM receiver. Common content can be channel content that can be viewed by both types of receivers. For example, channels 1 to 99 can be common to both receivers, but channels higher than 99 can only be processed by the new receivers. The second bit stream includes additional content. For example, the additional content can be, but is not limited to, local station broadcasts, HDTV information, data and additional channels. The QPSK/OQPSK receivers are not required to process the additional content. However, the PSK/QAM receivers are required to process the additional content information.

Specifically, each signal point of the QPSK/OQPSK symbol is expanded into a cluster of points. The points are no longer required to be exactly on the 45 degree lines from the axis as the conventional QPSK signal. This provides a modified QAM signal constellation. The new modified signal constellation is still transmitted at the same symbol rate as the old QPSK/OQPSK rate. However, now the cluster carries the information of one data stream and the exact location of the signal point in the cluster that conveys the additional information. The additional data rate achievable by the present invention depends on how much additional e.i.r.p. can be made available. The QPSK/OQPSK receivers, having no knowledge of the detailed structure of the cluster, treat each cluster as a single signal point. The deviation from the original symbols will be handled as noise. This noise will have impact on the receiver's performance, in particular the receiver's ability to maintain synchronization. The PSK/QAM receivers are aware of the signal constellation and can process the modified PSK/QAM signal to obtain both the information conveyed by the cluster and the information buried in the details of the cluster. In an embodiment of the present invention, the first bit stream performs the conventional QPSK/OQPSK modulation and the second bit stream performs a different modulation. Then the two modulated outputs are summed together to form a new signal.

Referring to FIG. 3, the second information bit stream is scrambled by scrambler 102 so that all bit patterns in the information signal appear to be equally likely over a period of time. The modulator 100 accepts both bit streams and modulates them into a desired signal constellation of a higher order modulation on a symbol by symbol basis. Although the scrambler 102 randomizes the bit patterns, the pattern jitters caused by higher order modulation cannot be completely eliminated. Therefore, by examining the second bit stream before transmission, the uplink determines the exact amount of jitter the additional information embedded in the higher order modulation can create and can adjust for the jitter.

The second bit stream is periodically interrupted for a short duration while the carrier phase and symbol timing devices 104, 106 and 108 compensate for errors in the bit stream. The interruption is chosen to be a fraction of the time constant of the phase and timing recovery loop of the QPSK/OQPSK receivers. This allows the QPSK/OQPSK receivers to continue to operate and demodulate the first bit stream. Since the time duration needed to transmit the compensation pattern is a small fraction of the duration between the interruptions, the associated overhead is very small. The first stream and second stream are then combined to select the symbols of the backward compatible PSK/QAM signal.

FIGS. 2A-2C each show a symbol pattern organized to allow backwards compatibility with the QPSK/OQPSK receivers. Specifically, the modified PSK/QAM signal should be designed to allow the QPSK/OQPSK receivers having QPSK and OQPSK demodulators to maintain carrier phase and symbol timing synchronization. One means of accomplishing this is to design the constellation of higher order modulation sufficiently close to the original modulation at the expense of a much higher transmit power requirement.

FIG. 2A depicts an embodiment of the present invention for an 8 PSK modulation. The higher order modulation signal which is a modified PSK/QAM signal is also grouped in clusters with each cluster corresponding to one of the symbols for the QPSK/OQPSK receivers that use QPSK or OQPSK modulation.

FIG. 2B shows an embodiment of the present invention using an 8 QAM signal. The 8 symbols are also grouped into four clusters that are not uniformly spaced and with phase shifts. However, each one of the four clusters corresponds to a symbol in a conventional QPSK/OQPSK signal. Thus QPSK/OQPSK receivers can process the modified PSK/QAM signal.

Similarly, FIG. 2C depicts a 16 QAM signal organized according to an embodiment of the present invention. The symbols are no longer uniformly spaced as in a conventional 16 QAM signal as shown in FIG. 1C. Rather, the symbols are grouped into four clusters. Each of the clusters corresponds to one of the symbols for a QPSK/OQPSK signal.

The difference between a conventional QPSK/OQPSK signal and a modified PSK/QAM signal according to the teachings of the present invention is that the symbols are not uniformly spaced in the embodiments of the present invention as in a conventional QPSK/OQPSK and PSK/QAM signal. This results in an asymmetrical signal.

Furthermore, since additional information is conveyed via the symbols inside each cluster, the separation among the symbols determine the power required for the new technology receivers to receive the additional information. The greater the distance among the symbols, the more power that is required to be transmitted.

Referring to FIG. 3, in order to maintain backward compatibility, the first bit stream is preferably coded similar to a conventional QPSK/OQPSK signal. Specifically, every two bits in the first stream determines the cluster to which the signal will belong. The second bit stream will determine a point in the chosen cluster. Since the signal points are not necessarily exactly on the 45 degree lines, certain bit patterns will select a symbol with an increase in phase while other bit patterns result in a decrease in phase. The number of increases and decreases are counted and the phase is determined and a compensation is made. For example, in FIG. 4A which depicts an 8 PSK constellation in accordance with an embodiment of the present invention, a value of 1 represents an increase in phase while a value of 0 represents a decrease in phase.

However, for an 8 QAM signal of FIG. 4B, the second bit stream does not affect the phase directly. Therefore, no phase compensation is required as shown in FIG. 4B.

In contrast to the 8 QAM signal, a 16 QAM signal has a number of combinations to reflect an increase or decrease in phase. This is illustrated in FIG. 4C. For example, a value of 10 reflects an increase in phase, a value of 01 reflect a decrease in phase and values of 00 and 11 are don't care values which represent no effect on the phase.

Figure 5:
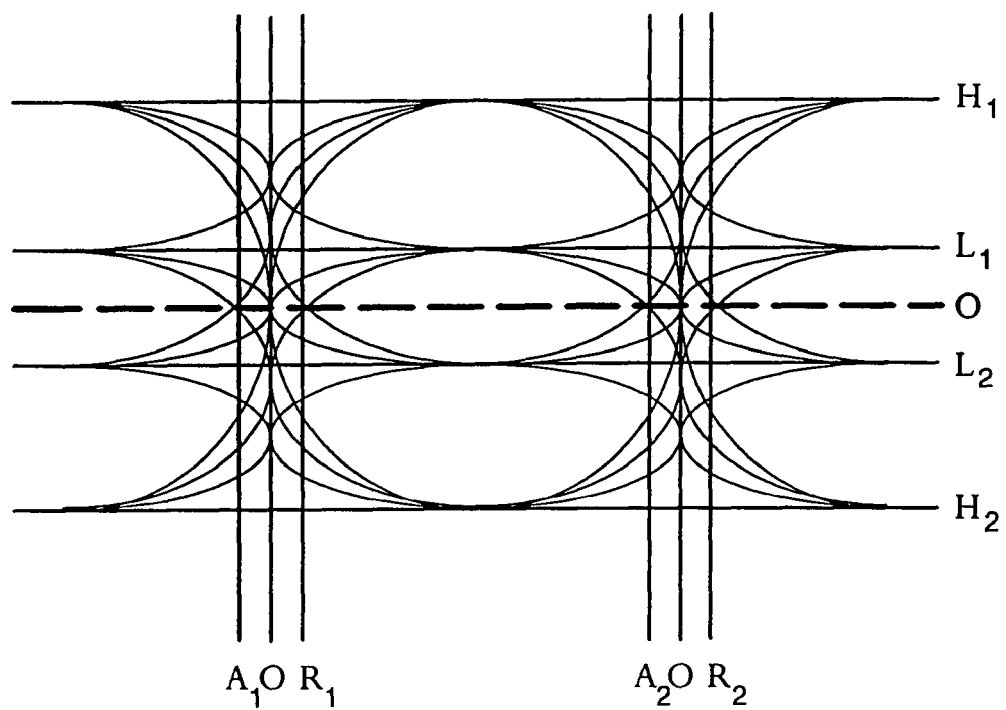
FIG. 5 is an example of a noiseless eye-diagram of a four level signal constellation in accordance with an embodiment of the present invention.

FIG. 5 is an example of a noiseless eye-diagram of a four level signal constellation in accordance with an embodiment of the present invention. Specifically, the noiseless eye-diagram 500 provides timing error estimates for the clusters of the higher order modulated signals. More specifically, eye-diagram 500 shows timing errors that occur between clusters. In other words, transitions that occur between clusters result in timing errors. For example, the noiseless eye diagram can provide timing error estimates for the four level signals in each component of the constellations of FIGS. 2A-2C and 4A-4C. The four solid horizontal lines illustrated by $H_1$, $L_1$, $H_2$ and $L_2$ represent the nominal levels viewed in one component. That is, $H_1$ and $L_1$ represent one cluster and $H_2$ and $L_2$ represent a second cluster. The timing error accumulator 106 for a QPSK or OQPSK searches the zero crossing point of the eye diagram 500 where the zero crossing point is represented by the wide dash line. The timing error accumulator 106 detects zero crossings. The presence of multiple levels causes the zero crossing point to shift from an ideal center point depending on the transition.

As shown in FIG. 5, transitions from the same cluster do not cause zero crossing, whereas transitions between clusters cause zero crossing. For example, a $H_1$ to $H_2$ or $L_1$ to $L_2$ transition causes no timing jitter. However a H to L transition will cause the zero crossing to retard (R) whereas a L to H transition causes the zero crossing to advance (A) as marked by R and A respectively in the figure. By examining FIGS. 4A-4C, it can be seen that a transition can not be classified without considering the transition between the clusters.

FIGS. 6A-6C take into consideration the transition between the clusters. For example, each one of the clusters in FIG. 6A-6C is denoted as an A, B, C, and D cluster or quadrant. Specifically, symbols that were marked as undefined in FIGS. 4A-4C by assigning a 1 or 11 value to represent a high level signal and a 0 or 00 value to represent a low level signal, now also have alphabets assigned to the values. Thus each of the symbols is represented by concatenating an alphabet from the first bit stream and a numeral from the second bit stream. The symbol timing error detector simply accumulates the type of transitions in both components. Each of the components is weighted equally. The difference between the number of advances and retards equals the amount of timing errors to be compensated for. An opposite type of transition can be sent to compensate for the timing error.

It should be noted that since no control is exerted over the first bit stream, and the symbol timing error can not be compensated for all the time, compensation phase error and timing error can not be performed independently. Since modems are more sensitive to phase error than timing error, phase error compensation should preferably take priority over timing error compensation. This is particularly important for 8 PSK modulation.

Any of the signal constellations can be considered as two components one vertical the other horizontal. The signal can assume either a high level position or low level position in each of the components. For 16 QAM signals, the compensation can be done in both components at the same time, in one embodiment of the present invention, or only in one component in a different embodiment of the present invention. Since transitions within the same cluster do not generate zero crossing, the same type of transitions can be sent multiple times for all three types of modulation. Thus, a return can be made to a given level without undoing the compensation. The timing error compensation and the phase error compensation can be performed at the same time to reduce the total number of compensation symbols needed.

Once compensation is applied, the distance between symbols within a cluster can be increased without having to directly adjust the distance between the clusters. Since the symbol error rate of the communication link is a function of the minimum distance between two symbols, a signal constellation whose distance between adjacent symbols is equal, generally, yields the best performance, given a fixed power level available. With this compensation technique, it is possible to send 8 PSK, 8 QAM or 16 QAM with any asymmetry while still maintaining backward compatibility with QPSK and OQPSK receivers.

FIGS. 7A-7C depict embodiments for providing alternative coding to detect the high to low or low to high transitions of symbols. However, the alternative coding is only possible at the expense of an increase in complexity for detecting phase imbalance. As in previous figures, the clusters are labeled alphabetically A-D. However, the alternative coding is achieved at the expense of a slight increase in complexity. With this embodiment, the phase bias cannot be detected by simply looking at the bit pattern. Rather, in the first and third quadrant, a value of 10 will reflect an increase in phase bias and a value of 01 will reflect a decrease in phase bias. In the second and fourth quadrants, a value of 01 will reflect an increase in phase bias and a value of 10 will reflect a decrease in phase bias.

Figure 8:
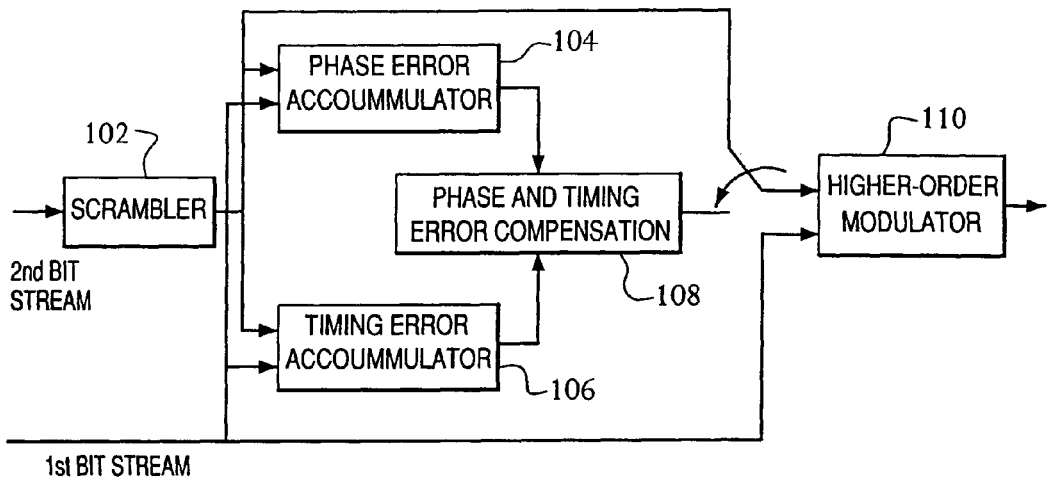
FIG. 8 is a block diagram of a satellite communications system for applying the alternative coding as described in FIGS. 7A-7C in accordance with an embodiment of the invention.

FIG. 8 is a block diagram of a broadcast communications system for applying the alternative coding as described in FIGS. 7A-7C in accordance with an embodiment of the invention. Satellite communications system 100 is similar in operation to satellite communications system 300 except the first bit stream is coupled to the phase error accumulator 104 and timing error accumulator 106 and the output of the higher order modulator would provide signals similar in scope to FIGS. 7A-7C. In both embodiments of the invention of FIGS. 3 and 8, the phase and timing compensation is transmitted at the end of an information block. The compensation can be considered as redundancy and can be used as error correction and/or detection.

Figure 9:
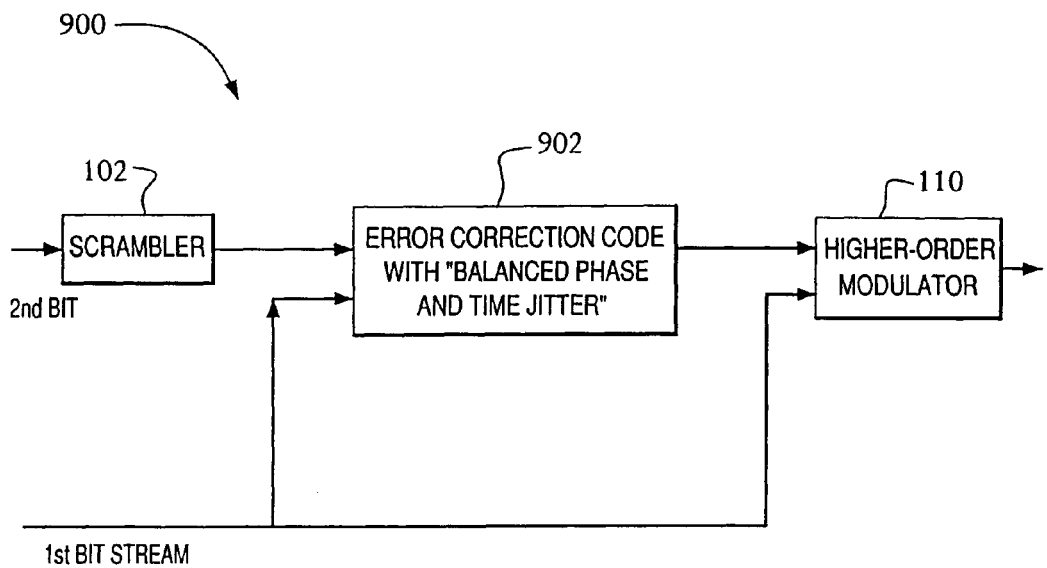
FIG. 9 is a block diagram of a satellite communications transmission system for applying preselected code words in accordance with an embodiment of the invention.

FIG. 9 is a block diagram of a broadcast communications system for applying preselected code words in accordance with an embodiment of the invention. Specifically, the invention provides a coding technique wherein a block of information is mapped to a block of code words which have balanced phase and timing jitter properties. Any code word satisfying the balance property is used. The code word can be non-systematic. It is possible to construct a set of sequences with balanced phase and timing jitter properties and assign the mapping between each possible information bit patterns to them. Therefore, there is no need to accumulate phase and timing errors since these errors are eliminated by coding.

The broadcast system 900 is constructed differently from systems 100 and 800. The second bit stream is provided to scrambler 102. The output of the scrambler 102 and the first bit stream are provided to the error correction code with balanced phase and time jitter block 902. The output of block 902 and the first bit stream are then provided to the higher order modulator 110 which provides an asymmetric backwards compatible modulated signal.

Figure 10:
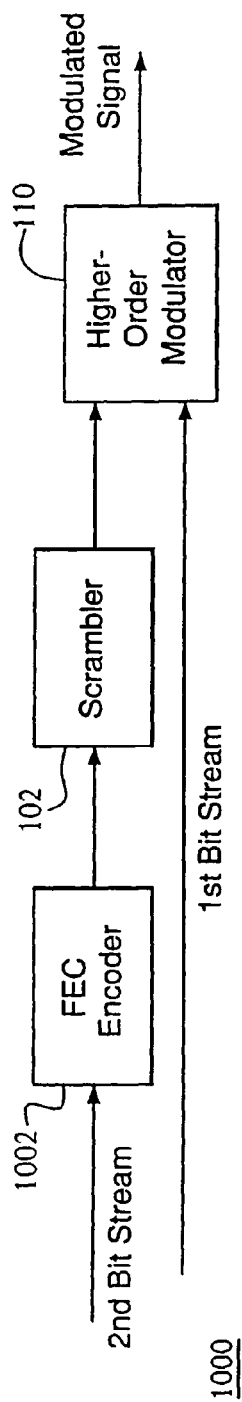
FIG. 10 is a block diagram of a transmitter for providing a backward compatible modulated signal in accordance with an embodiment of the present invention.
Figure 15:
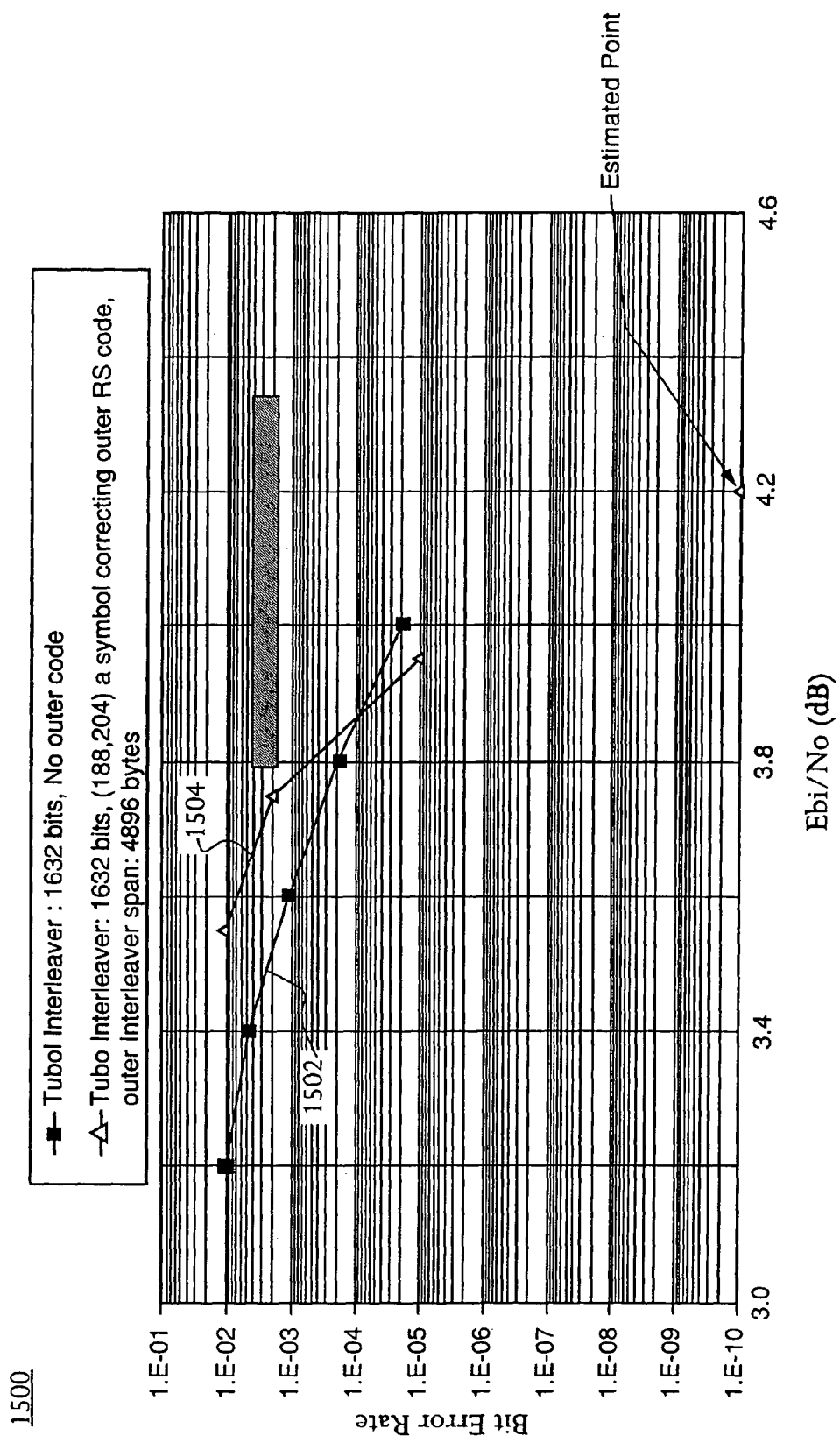
FIG. 15 is a graph of a bit error rate of a turbo encoded second bit stream in accordance with an embodiment of the present invention.

Referring to FIG. 10 which is a transmitter 1000 for providing a backward compatible modulation signal in accordance with an embodiment of the present. The transmitter 1000 comprises a forward error correction (FEC) encoder 1002, the scrambler 102 and the higher order modulator 110. The second bit stream is provided to the FEC encoder 1002 which processes the second bit stream and provides the encoded second bit stream to the scrambler 102 which scrambles the encoded second bit stream. In an embodiment of the present invention, turbo code is used to process the second bit stream. In another embodiment of the invention, the second bit stream is processed with a Reed-Solomon code concatenated with the turbo code. FIG. 15 describes the bit error rate for the second bit stream after it has been turbo encoded.

Finally, both the first bit stream and the scrambled second bit stream are provided to the higher order modulator 110 which provides a backwards compatible modulated signal.

In an embodiment of the present invention, the following two conditions should preferably be met. First, different cluster configurations should preferably represent different performance trade-offs for old technology and new technology receivers. Second, each cluster should preferably be symmetrical. For example, a symbol in a quadrant should preferably be located at a point where the y equals x and/or y equals negative x, where x and y are axis points. Having y=x and/or y=−x avoids bias in compatible channel synchronous loops.

Figure 11A:
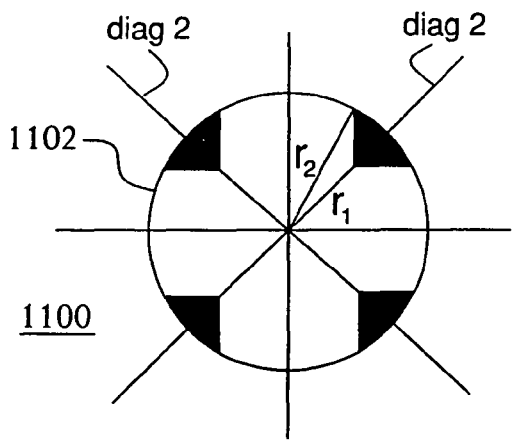
FIGS. 11A through 11D are diagrams of various constellations in accordance with an embodiment of the present invention.

Furthermore, for the backward compatible modulated signal to be compatible with a conventional QPSK signal, the backward compatible modulated signal should preferably have the signal constellations disposed within the shaded area as shown in FIG. 11A where the power gain $(P_g)=(r_2/r_1)^2$. The power gain is the additional power required to support the new services contained in the second bit stream of the modulated backwards compatible signal while maintaining the services for the old technology receivers. In addition, the signal constellation should preferably be symmetrical to the diagonal lines (diag 1 and diag 2) which crossover the symbols of a conventional QPSK constellation.

Figure 12:
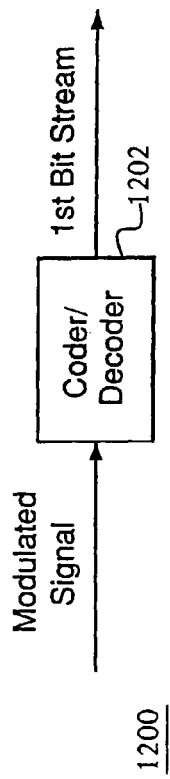
FIG. 12 is a conventional receiver for processing conventional QPSK and OQPSK signals.

For an old technology receiver, as shown in FIG. 12, the common information contained in the first bit stream is retrieved by coder/decoder 1202. However, the information from the second bit stream appears as noise to the old technology receiver. Specifically, signals received in a quadrant are demodulated as a QPSK signal within the current quadrant.

The old technology receiver's carrier recovery loop (CRL) and the symbol timing loop (STL) are characterized by a spectral density function of pattern noise, noise to signal ratio at the output of a phase detector (not shown) for a phase lock loop (PLL) circuit (not shown), and an S-Curve. For white noise, the noise density to signal ratio is described in the following equation:

$$\sigma^2 = N(O)/A^2$$

where N(f) is the spectral density of the noise for the phase detector, A is the derivative of the S-curve when there is zero error. Variance of the phase error is equal to $\sigma^2 2B_L$ where $B_L$ represents the loop bandwidth for the receiver.

If there were no constraint of maintaining synchronization for the old technology receiver while using a backwards compatible modulation signal, any constellation with finite power gain can be used for performing backwards compatibility. It is the power gain that determines the cost of supporting backwards compatibility with a particular constellation.

In addition, limiting the power gain reduces the area that each cluster can reside. For example, in FIG. 11A, reducing the power gain results in a decreased shaded area. The power gain affects the performance of the first bit stream and the second bit stream. The power gain and θ can also be given by the following equations for 8 QAM:

$$(r_2/r_1)^2 \leq P_g$$

$$\theta = \pi/2 - 2 \arctan(1/\sqrt{2p_g} - 1)$$

Figure 14:
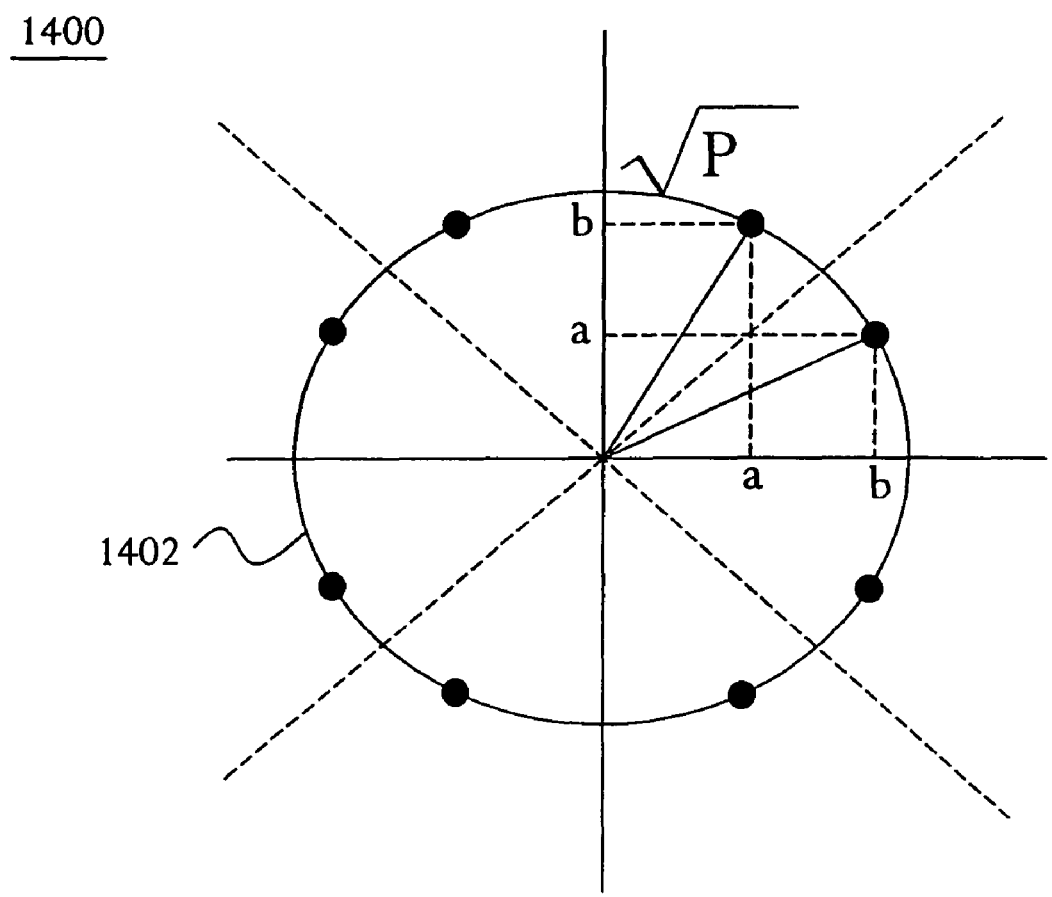
FIG. 14 is a diagram for calculating a power gain in accordance with an embodiment of the present invention.

Referring to FIG. 14, in general, the power gain can also be calculated from the following formula:

$$p_g = 10 \log_{10}(P/(x^2_{min} + y^2_{min})) \geq 0$$

where P is the peak power of the constellation; $x_{min}$ is the smallest magnitude of the in-phase of all signal points; $y_{min}$ is the smallest magnitude of the quadrature phase of all signal points.

Figure 13:
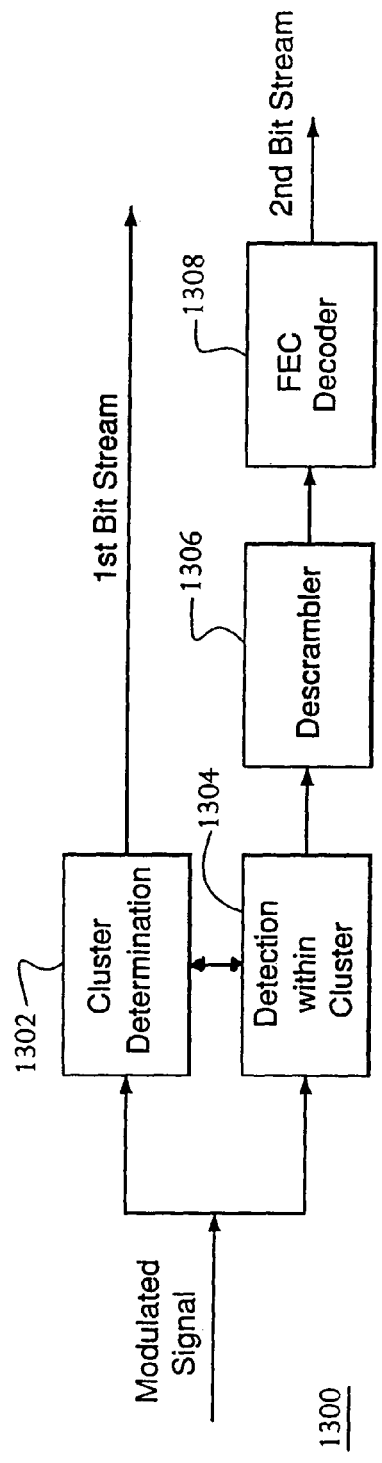
FIG. 13 is a receiver for processing the backwards compatible modulated signal in accordance with an embodiment of the present invention.

For the new technology receivers as shown in FIG. 13, The new technology receiver determines from the received signal which quadrant of the received signal the additional information resides in. This will recover the first bit stream. It will be appreciated that the determination of the quadrant is typically not symbol by symbol but rather through decoding the error correction coding. The quadrant information can be used for the decoding and demodulation for the second data stream.

A modulated signal is received by a cluster determination module 1302. The cluster detection module 1304 also processes the received signal. Its function is to derive a likelihood of each additional transmitted bit/symbol. With the quadrant information obtained from the first data stream, this likelihood information can be obtained by examining a log likelihood function. The demodulated backward compatible signal is provided to descrambler 1306 which descrambles the signal and provides the decoded signal to FEC decoder 1308 which decodes the descrambled signal and provides content contained in the second bit stream.

In one embodiment of the present invention, the new technology receiver uses the same approach that the old receiver uses to process the first bit stream. In this embodiment, the additional bit stream is processed after the first bit stream is recovered.

In another embodiment of the present invention, the new technology receiver recovers both the first and the second bit stream with the new signal constellation. That is, the new technology receiver is aware of the modified constellation and understands how to process the received signal for both the first and the second bit stream. This approach will lead to better performance since it does not treat the deviation of the signal points from the QPSK as noise.

It will be appreciated by those skilled in the art that the two previously mentioned embodiments can be practiced separately or in combination with each other without departing from the scope of the present invention.

Figure 11B:
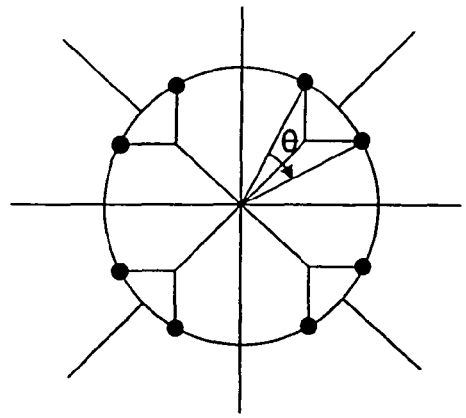
Figure 11C:
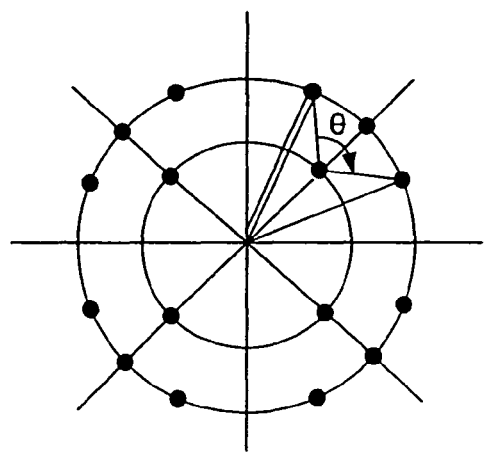
Figure 11D:
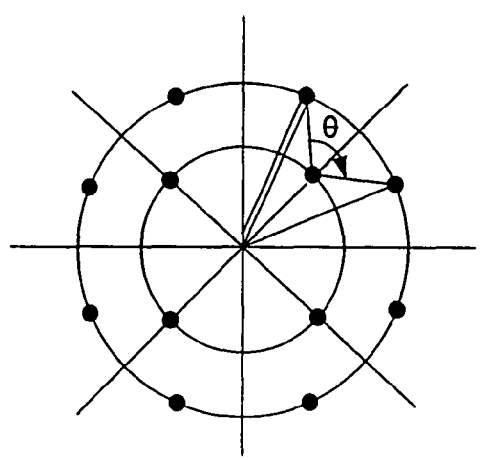

The backward compatible modulated signal should preferably have alphabets that are in multiples of four as shown in FIGS. 11B through 11D. 11B through 11D are PSK and QAM constellations that have been modified in accordance with an embodiment of the present invention. One and two extra modulation bits per symbol can be transmitted for the constellation quadrants of the modified 8 PSK and 16 QAM constellations, respectively. Three modulation bits can be transmitted via two symbols of the 12 QAM signal of FIG. 11D because up to 9 combinations can be produced whereas only 8 combinations are needed to represent 3 bits. The supported data rate of the second bit stream depends on the amount of additional power available. Illustratively, for the 12 QAM constellation of FIG. 11D, two coded bits on the first bit stream selects the quadrant. Three coded bits from the second bit stream preferably selects one four dimensional signal point. In another embodiment of the present invention, three coded bits on the second bit stream preferably selects two two-dimensional signal points. However, the two two-dimensional signal points do not have to belong to the same quadrant. The coded bits are derived from the FEC encoder 1002.

Since the second bit stream typically experiences more noise than the first bit stream, a low rate turbo code is needed to provide the required performance. The turbo code can be punctured to provide a good trade-off between the information rate and the error rate performance.

With reference to FIG. 11B which depicts an 8 PSK signal modified in accordance with an embodiment of the present invention, a symbol design parameter, θ, is used to adjust the distance between two possible symbols in the same quadrant, which is directly related to the extra power, $P_g$, available. This principle can also be applied to the symbols within a quadrant for the 16 QAM and 12 QAM constellations of FIGS. 11C and 11D, respectively to determine $P_g$. Using the Euclidean distance, an equivalent signal to noise ratio to demodulate the extra information for each constellation which comprises the second bit stream, and an estimated best turbo code rate that can be used to match the bit-error rate performance of the first bit stream can be calculated. The information rate per symbol normalized against that for the first bit stream is the percent data rate for the second bit stream.

Figure 16:
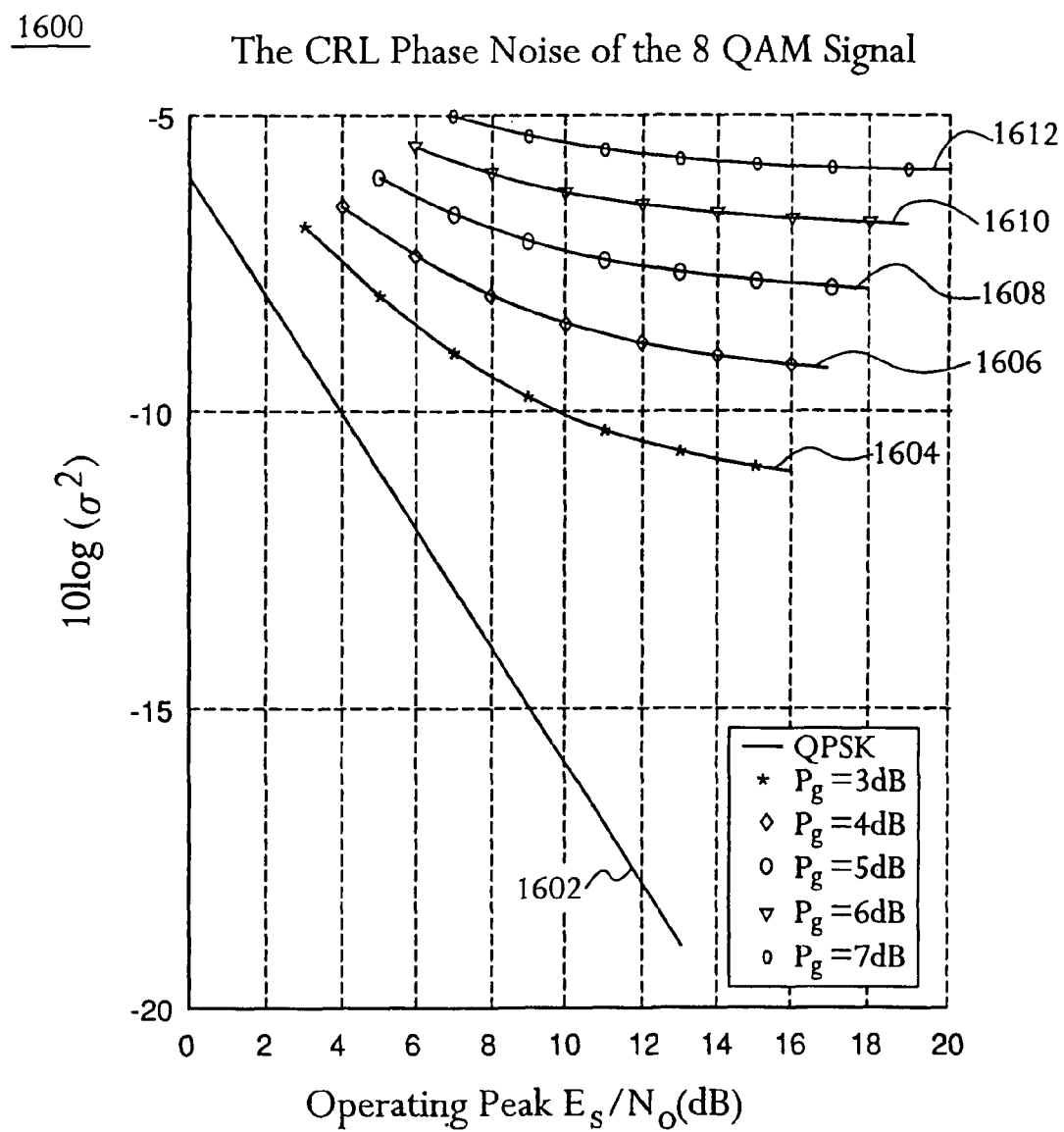
FIG. 16 is a graph of a carrier recovery loop phase noise for an 8 QAM signal in accordance with an embodiment of the present invention.
Figure 17:
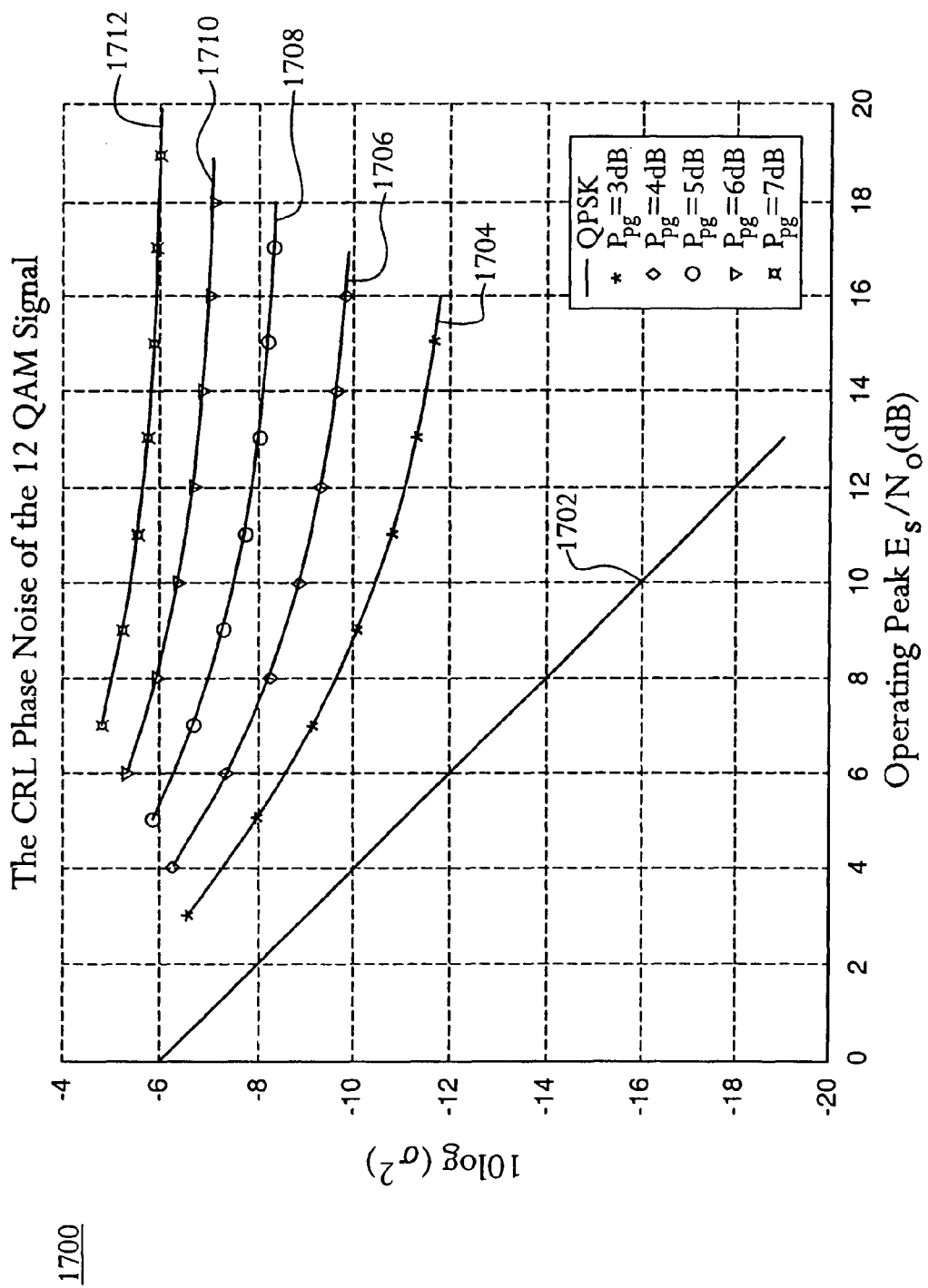
FIG. 17 is a graph of a carrier recovery loop phase noise for a 12 QAM signal in accordance with an embodiment of the present invention.
Figure 18:
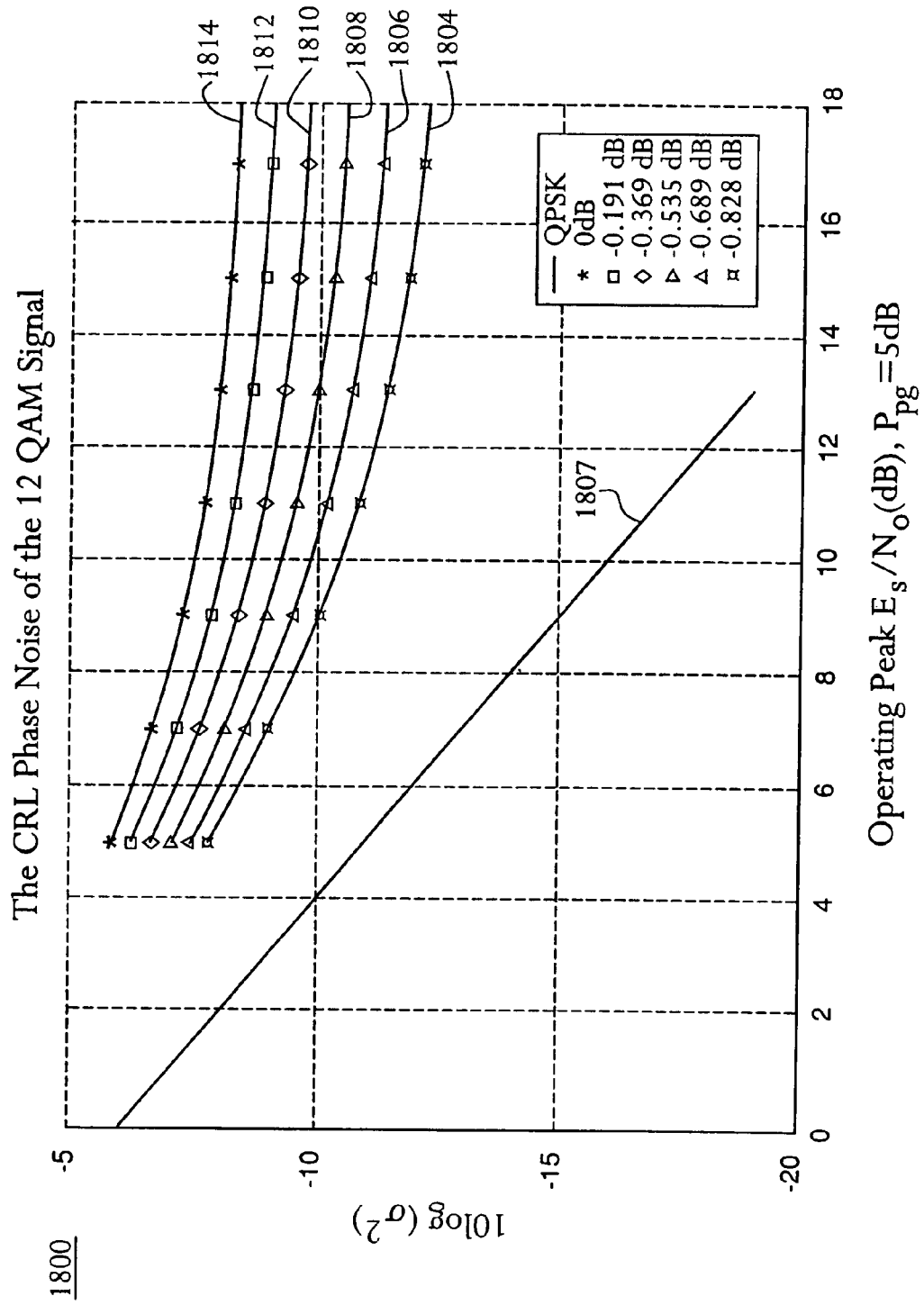
FIG. 18 is a graph of a carrier recovery loop phase noise for an 12 QAM signal operating at a peak power gain of 5 dB in accordance with an embodiment of the present invention.

Table 1 summarizes the conditions and requirements for an additional power gain of 3, 4, 5, and 6 dB for 8 PSK, 16 QAM and 12 QAM constellations.

principle of FIG. 16 applies to FIG. 17 which is a graph of CRL phase noise for a conventional 12 QAM signal. However, FIG. 18 is a graph of the CRL phase noise for a modified 12 QAM signal. Compared to the graph of FIG. 17, the noise is much less for the modified 12 QAM signal at different power gains.

Figure 19:
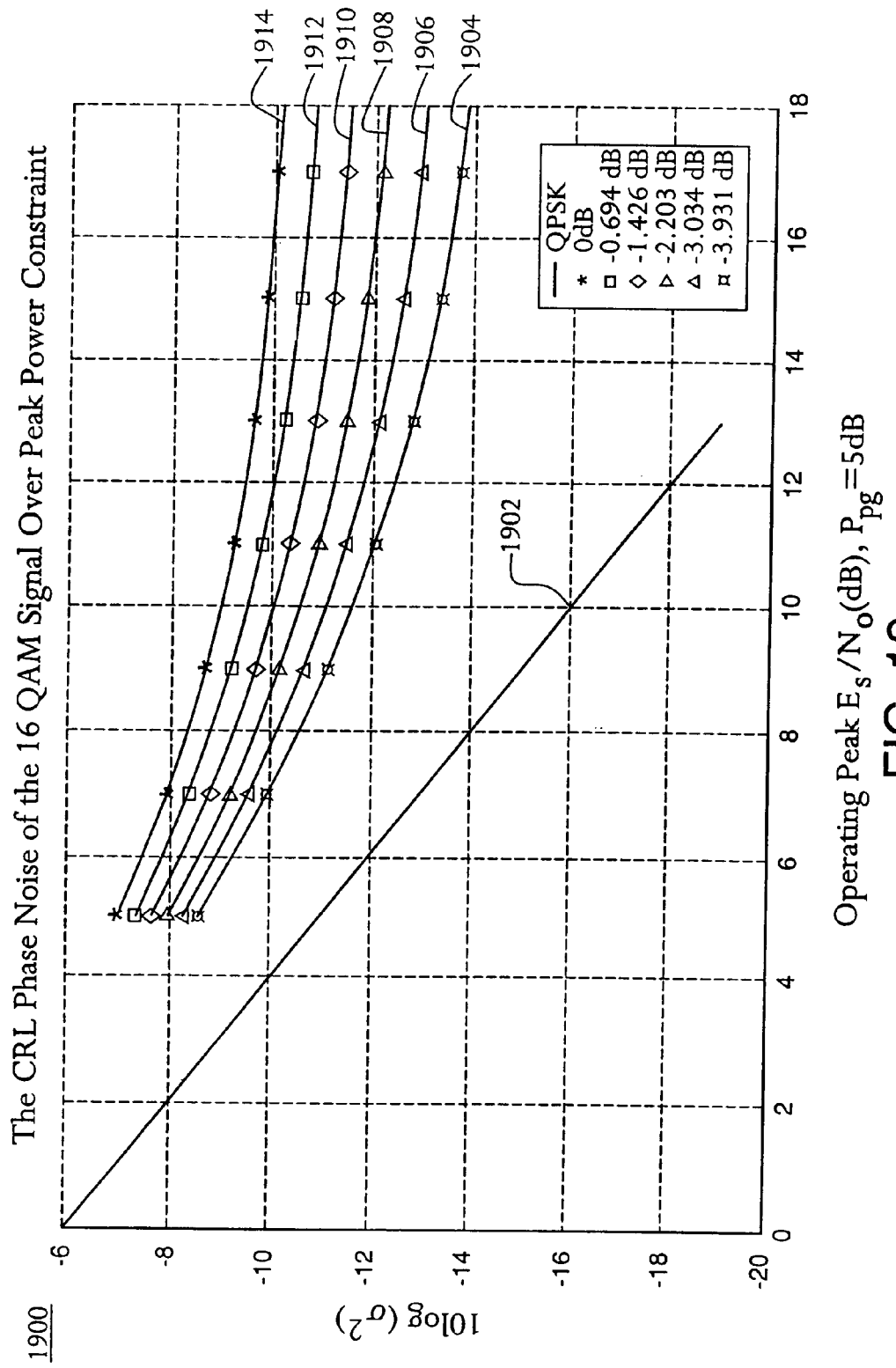
FIG. 19 is a graph of a carrier recovery loop phase noise for in 16 QAM signal operating at a peak power gain of 5 dB in accordance with an embodiment of the present invention.

FIG. 19 which is a graph of CRL phase noise for a 16 QAM signal also shows that the noise is reduced for modified QAMs at all levels of power gain.

Figure 20:
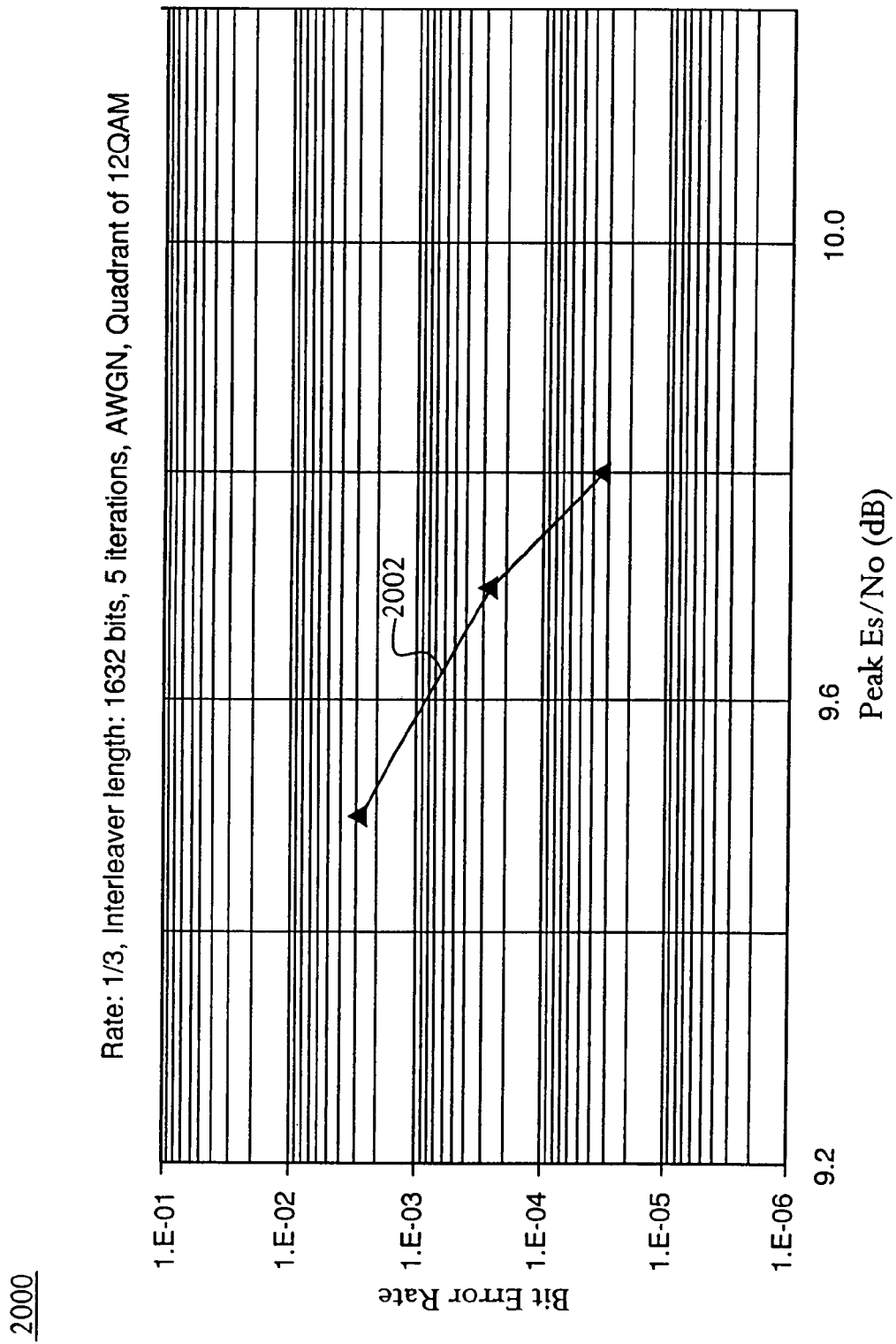
FIG. 20 is a graph of a bit error rate for a 12 QAM signal in accordance with an embodiment of the present invention.

In terms of the bit error rate for a modified QAM, FIG. 20 shows that the bit error rate is low. In particular, graph 2000 is for the bit error rate for a 12 QAM signal.

TABLE 1

| Add'l Power $P_g$ (dB) | 8 PSK Ideal θ | 8 PSK Ideal Data Rate (θ) | 8 PSK Worst Case Data Rate θ = 30° | 16-QAM dual ring Ideal Data Rate θ = 90° | 16-QAM dual ring Worst Case θ | 16-QAM dual ring Worst Case Data Rate (θ) | 12-QAM dual ring Ideal Data Rate θ = 90° | 12-QAM dual ring Worst Case θ | 12-QAM dual ring Worst Case Data Rate (θ) |
|---|---|---|---|---|---|---|---|---|---|
| 3 | 30° | 24% | 18% | | | | 18% | 90° | 18% |
| 4 | 37° | 35.8% | 22% | 23% | | | 33% | 72° | 29% |
| 5 | 43° | 44.6% | 28% | 39% | 78° | 27% | 50% | 66° | 42% |
| 6 | | | 35% | 56% | 78° | 46% | 72.5% | 60° | 62% |

Under the "Ideal" columns for $P_g$ in the range of 3 dB to 6 dB, ice of modulation depends on the amount of additional power available and the desired bit rate of the second bit stream which is a significant fraction of the first bit stream.

It is important to maintain the synchronization of the old technology receivers in the presence of pattern noise caused by the transmission of the additional information. Since there is knowledge of the synchronization loop design for each of the old technology receivers, it is assumed that all of the old technology receivers operate properly before the additional power is provided.

In an embodiment of the present invention, a conservative design criteria preferably requires the effect of additional pattern noise created by the backward compatible modulation signal process to be offset by the additional signal power. For instance, for the 8 PSK constellation of FIG. 11B having a $P_g$ of 3 dB, and a θ of 30°, under ideal conditions the additional pattern noise is offset by the additional power gain associated with a bit rate for the second bit stream that is 24% of the bit rate of the first bit stream. Under the worst case scenario the bit rate of the second bit stream is 18% of the rate of the first bit stream.

The θ is also adjusted or the 16 QAM and 12 QAM constellations of FIG. 11C and 11D to meet the pattern noise and additional power gain requirement. The best value for θ depends on the additional power gain that is available. From Table 1, it can be seen that 12 QAM gives the best performance. What can not be seen from Table 1 is that the pattern noise is white; the presence of signal points where y=x and y=-x reduces pattern noise; and reducing θ reduces pattern noise for all the constellations. For example, when the outer two points for the 12 QAM constellation are moved closer, the performance of the second bit stream is compromised but the old technology carrier recovery loop noise is reduced significantly.

Figure 21:
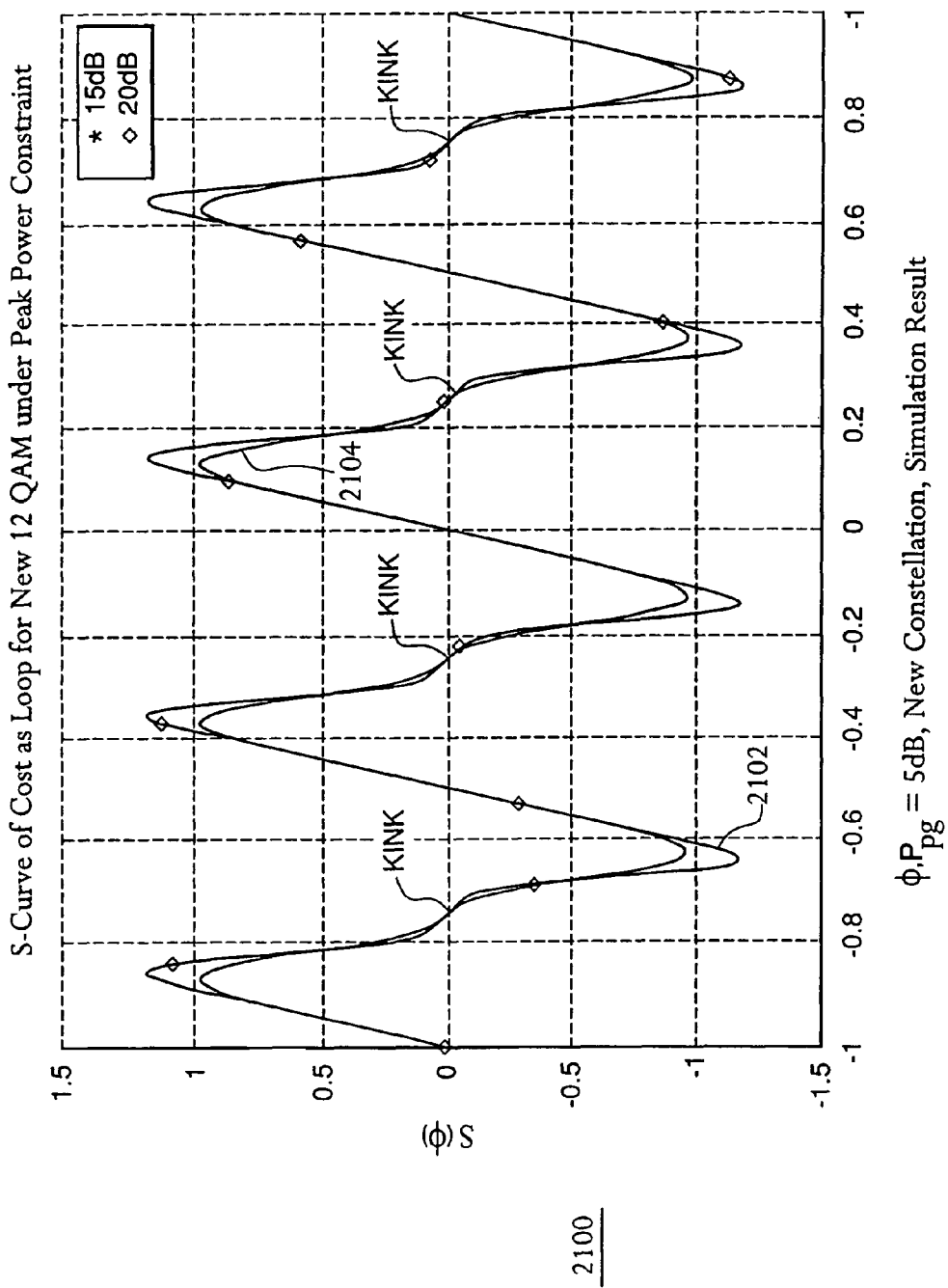
FIG. 21 is a graph of an S-curve for a 12 QAM signal operating at a peak power gain of 5 dB in accordance with an embodiment of the present invention.
Figure 22:
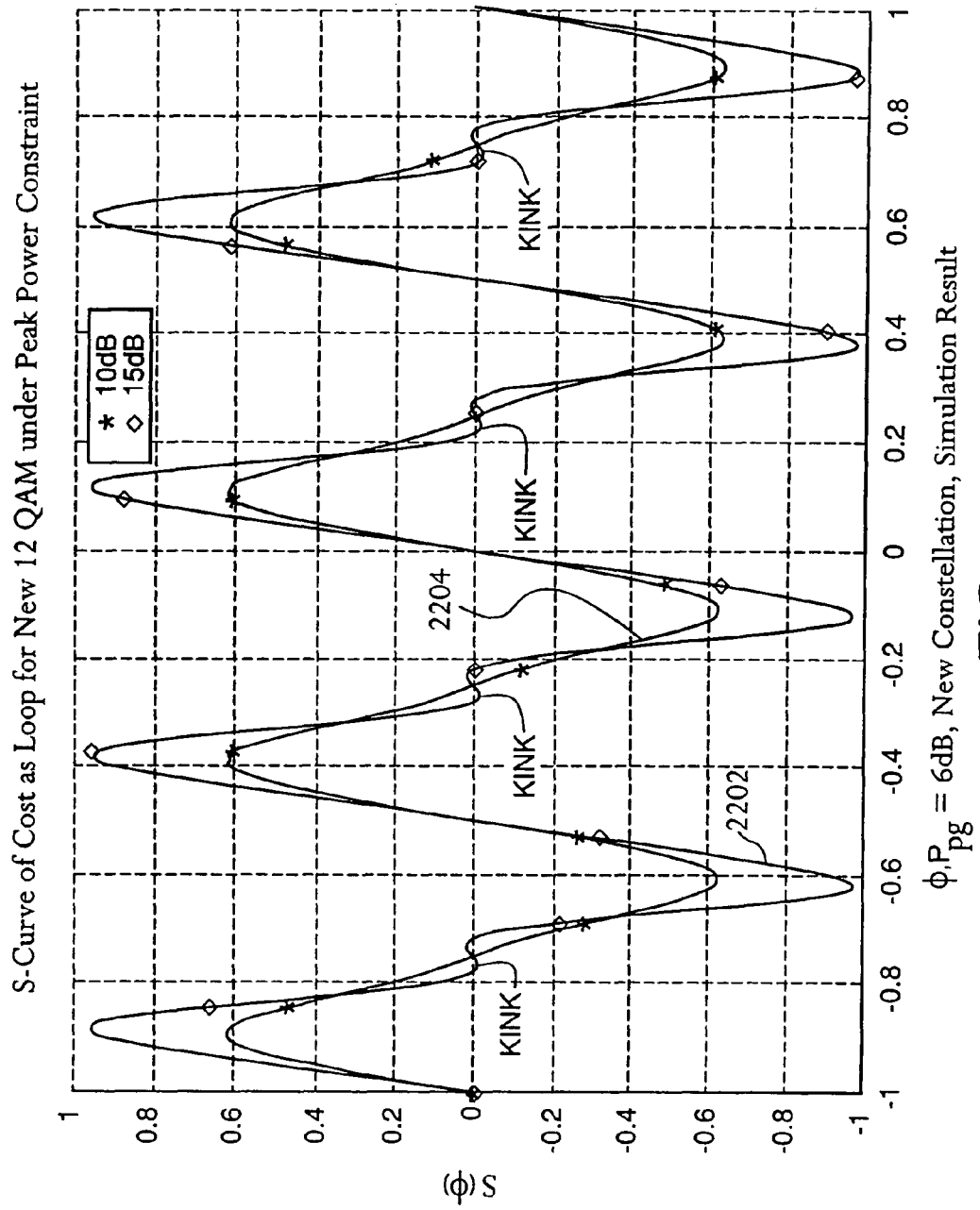
FIG. 22 is a graph of an S-curve for a 12 QAM signal operating at a peak power gain of 6 dB in accordance with an embodiment of the present invention.

With reference to FIG. 16 which is a graph of the CRL phase noise for an 8 QAM signal for different power gains, plot 1602 shows a conventional QPSK signal which is shown for reference purposes. As plots 1604 through 1612 show, the noise for a CRL is more as the power gain increases. The same FIGS. 21 and 22 are CRL S-curves for a 12 QAM constellation at 5 dB power gain and 6 dB power gain, respectively and measure the noise tolerance of a receiver. Ideally, the S-curves should have a sinusoidal shape with out any kinks. The kinks, in very broad terms, represent a high probability that a false lock will occur. However, if the kink is small, as in FIGS. 21 and 22, the affects will not be noticeable.

Figure 23:
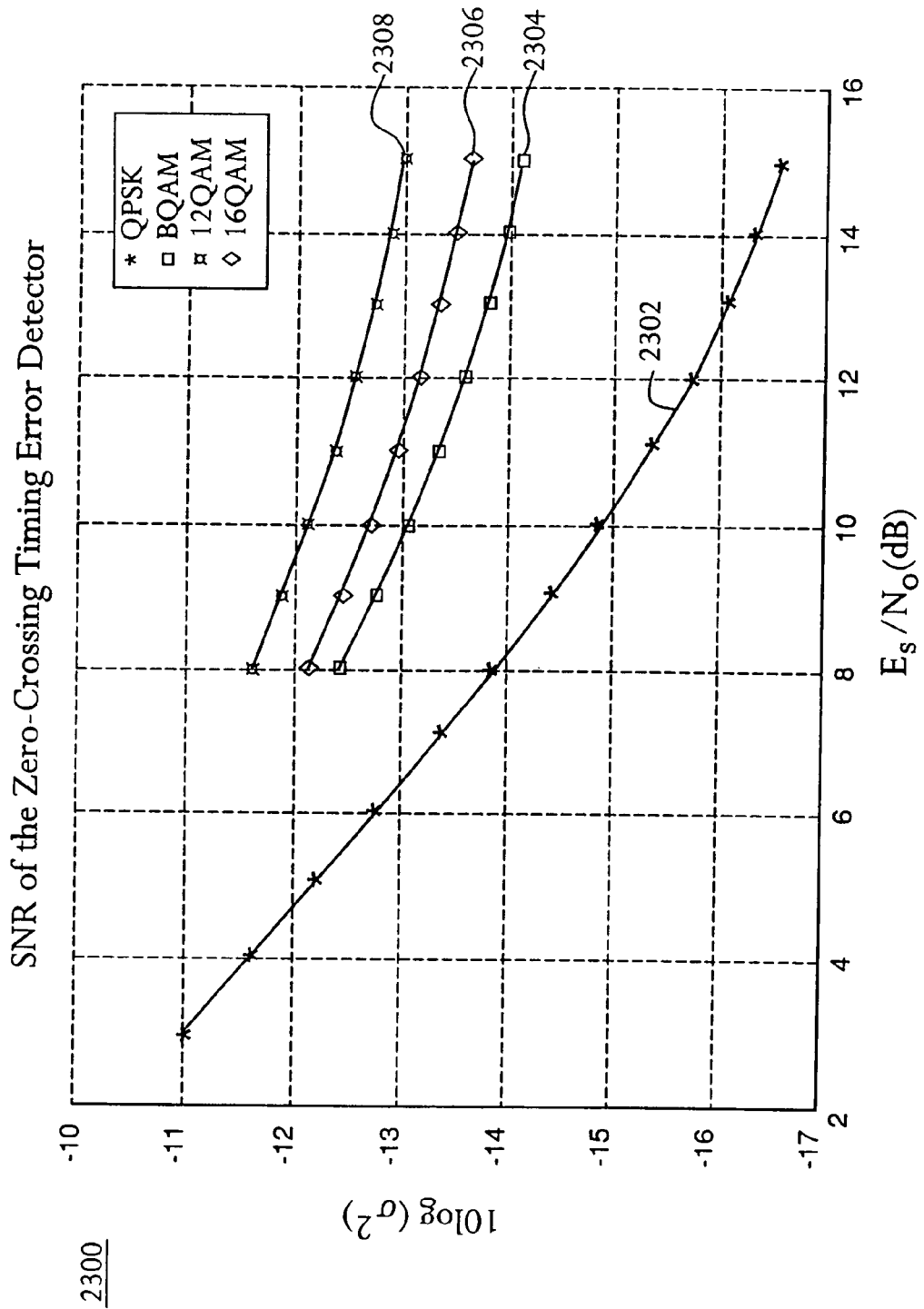
FIG. 23 is a graph of signal to noise ratios for zero crossing timing errors for various types of constellations in accordance with an embodiment of the present invention.
Figure 24:
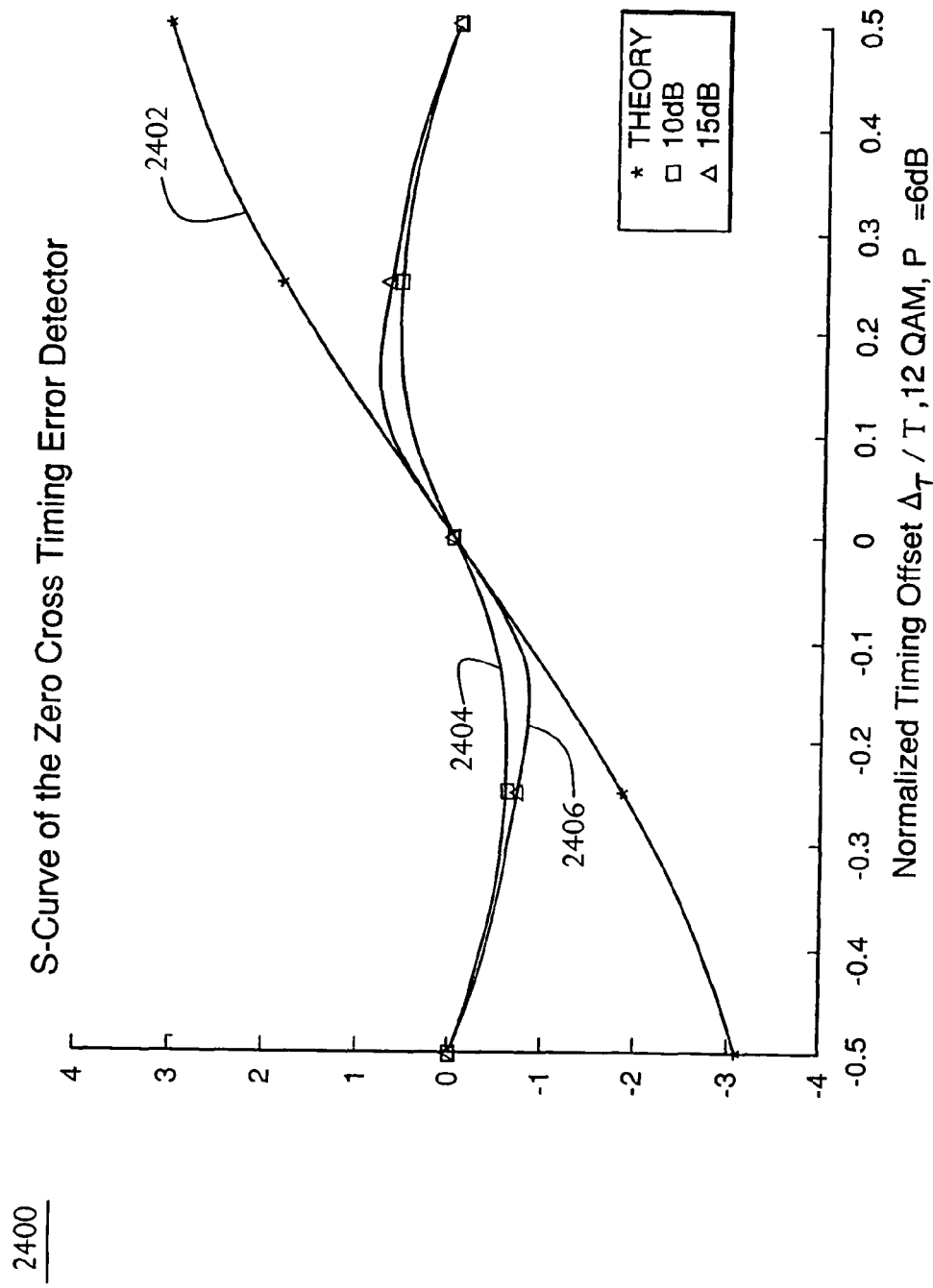
FIG. 24 is a graph of an S-curve of the zero crossing timing error for a 12 QAM signal in accordance with an embodiment of the present invention.

FIG. 23 is a graph 2300 of the signal to noise ratio for the zero crossing timing error for various types of constellations. Graph 2300 shows that pattern noise is not a limiting factor for the symbol timing loop. Similarly, FIG. 24 is a graph 2400 of an STL S-curve for an old technology receiver using a 12 QAM constellation having a power gain of 6 dB. As shown by graph 2400 all the plots are very similar for the 12 QAM constellation.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for providing backward compatible communications, comprising:
   providing a first bit stream including content that is common to both a first receiver and to a second receiver;
   providing a second bit stream including content not included in the first bit stream; and
   combining the first bit stream and the second bit stream at an encoder;
   balancing phase and timing errors associated with the first bit stream and the second bit stream at the encoder; and
   selecting an asymmetrical backward compatible signal via an output of the encoder.

2. A method of claim 1, wherein the first receiver is a quaternary phase shift keying (QPSK)/offset quaternary phase shift keying (OQPSK) receiver, and the second receiver is a phase shift keying (PSK)/quadrature amplitude modulation (QAM) receiver.

3. A method of claim 2, wherein the asymmetrical backward compatible signal is a modified 16 QAM signal.

4. A method of claim 2, wherein the asymmetrical backward compatible signal is a modified 8 PSK signal.

5. A method of claim 2, wherein the asymmetrical backward compatible signal is a modified 8 QAM signal.

6. A method of claim 1, wherein the asymmetrical backward compatible signal includes symbols grouped into clusters.

7. A method of claim 6, wherein spacing among the clusters of the asymmetrical backward compatible signal is uniform.

8. A method of claim 6, wherein spacing between the symbols of the asymmetrical backward compatible signal is non-uniform.

9. An apparatus for providing backward compatible communications, comprising:
an encoder configured to combine a first bit stream and a second bit stream, wherein the first bit stream includes content that is common to a first receiver and a second receiver, and the second bit stream includes content not included in the first bit stream,
wherein the encoder is further configured to balance phase and timing errors associated with the first bit stream and the second bit stream, and to select an asymmetrical backward compatible signal.

10. An apparatus of claim 9, wherein the first receiver is a quaternary phase shift keying (QPSK)/offset quaternary phase shift keying (OQPSK) receiver, and the second receiver is a phase shift keying (PSK)/quadrature amplitude modulation (QAM) receiver.

11. An apparatus of claim 10, wherein the asymmetrical backward compatible signal is a modified 16 QAM signal.

12. An apparatus of claim 10, wherein the asymmetrical backward compatible signal is a modified 8 PSK signal.

13. An apparatus of claim 10, wherein the asymmetrical backward compatible signal is a modified 8 QAM signal.

14. An apparatus of claim 9, wherein the asymmetrical backward compatible signal includes symbols grouped into clusters.

15. An apparatus of claim 14, wherein spacing among the clusters of the asymmetrical backward compatible signal is uniform.

16. An apparatus of claim 14, wherein spacing between the symbols of the asymmetrical backward compatible signal is non-uniform.

17. A method of processing a first and a second data stream, comprising:
demodulating the first data stream using a first modulation technique and algorithm to extract cluster information associated with the first data stream corresponding to a first decoder, wherein the first and second data streams have been modified to compensate for phase and timing errors;
providing the cluster information to a second decoder, the cluster information providing decoding information associated with the second data stream; and
decoding at the second decoder the second data stream, wherein the first data stream includes content common to the first decoder and to the second decoder.

18. A method of claim 17, wherein the cluster information comprises at least one of a hard decision decoding or soft reliability associated with each modulation symbol of the first modulation technique.

19. A method of claim 17, wherein the first data stream is compatible with the first and second decoders.

20. A method of claim 17, wherein the second data stream is compatible with the second decoder.

21. A method of claim 17, wherein the first modulation technique and algorithm comprises at least one of a quaternary phase shift keying (QPSK) or an offset quaternary phase shift keying (OQPSK) modulation/demodulation technique.

22. A method of claim 17, wherein the first modulation technique and algorithm comprises at least one of a quadrature amplitude modulation (QAM) or a phase shift keying (PSK) modulation/demodulation technique.

23. A method of claim 17, wherein the second encoder derives a reliability metric for decoding from the cluster information.

24. An apparatus for processing a first and a second data stream, comprising:
a demodulator configured to demodulate the first data stream using a first modulation technique and algorithm to extract cluster information associated with the first data stream corresponding to a first decoder, wherein the first and second data streams have been modified to compensate for phase and timing errors,
wherein the cluster information is provided to a second decoder, the cluster information providing decoding information associated with the second data stream, and
wherein the second data stream is decoded at the second decoder, and the first data stream includes content common to the first decoder and to the second decoder.

25. An apparatus of claim 24, wherein the cluster information comprises at least one of a hard decision decoding or soft reliability associated with each modulation symbol of the first modulation technique.

26. An apparatus of claim 24, wherein the first data stream is compatible with the first and second decoders.

27. An apparatus of claim 24, wherein the second bit data stream is compatible with the second decoder.

28. An apparatus of claim 24, wherein the first modulation technique and algorithm comprises at least one of a quaternary phase shift keying (QPSK) or an offset quaternary phase shift keying (OQPSK) modulation/demodulation technique.

29. An apparatus of claim 24, wherein the first modulation technique and algorithm comprises at least one of a quadrature amplitude modulation (QAM) or a phase shift keying (PSK) modulation/demodulation technique.

30. An apparatus of claim 24, wherein the second decoder derives a reliability metric for decoding from the cluster information.

31. A method for providing communications, the method comprising:
receiving a first bit stream that includes information common to a first receiver and to a second receiver;
receiving a second bit stream that includes information for the second receiver;
modifying phase and timing errors of the first bit stream and of the second bit stream; and
generating a composite signal including the modified bit streams.

32. A system configured to perform the steps of method claim 31.

* * * * *